June 18, 1968 R. L. BRUNDAGE 3,389,231

AUTOMATIC SPEED CHANGER FOR RECORD PLAYERS

Filed May 28, 1964

INVENTOR.
RAYMOND L. BRUNDAGE
BY Wm Walter Owen,
ATTY.

3,389,231

AUTOMATIC SPEED CHANGER FOR RECORD PLAYERS

Raymond L. Brundage, Villa Park, Ill.
(17 W. 370 Sunrise, Addison, Ill. 60101)

Filed May 28, 1964, Ser. No. 370,842
5 Claims. (Cl. 179—100.4)

ABSTRACT OF THE DISCLOSURE

An automatic speed changer for record players in which a specific tone is produced by the initial groove of each record, which tone in turn controls a frequency responsive device to select the particular speed at which that record should be played.

My invention relates in general to an automatic speed changer for record players and more specifically to a system for automatically controlling the speed control mechanism of a record player in accordance with a specific tone produced by the initial grooves of each record.

In the system of my invention, the initial groove of each record is cut to produce a specific tone, as the needle passes through the groove, the tone being different for the records requiring different speeds. A frequency selective device is provided, which is selectively operated in accordance with the tone produced by a particular record, to adjust the speed changing mechanism of the record player and cause it to rotate the record at the proper speed required for that record.

The main object of the invention therefore is to provide a selectively responsive device which is controlled from each record as it comes under the needle of the tone arm of a record player, to automatically adjust the speed of the player to correspond to the speed required for that particular record.

Among the features of the invention is the provision of frequency responsive devices controlled by tones of different frequency produced by the initial groove of a record to automatically adjust the speed of the record player.

Further objects and features will be apparent from the following detailed description having reference to the accompanying drawings in which.

Figure 1:
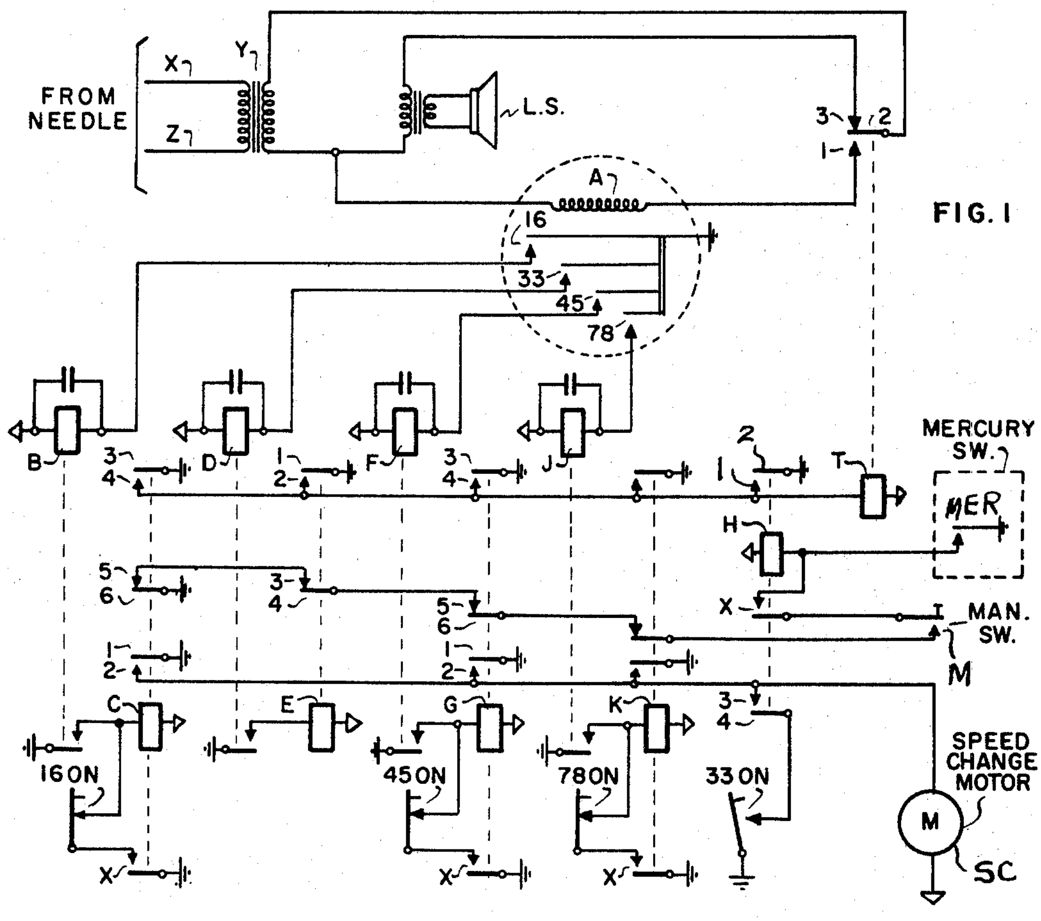
FIG. 1 is a schematic diagram of the circuit used in my invention.

Referring now to the diagram of FIG. 1, I have shown the leads X and Z leading from the needle cartridge to repeating coil Y, the secondary of which normally leads through the contacts 3 and 4 of relay T to the loudspeaker LS. The contacts M are closed whenever the record player is turned on by the usual on and off switch and the contacts MER represent a mercury contact mounted on the pickup arm of the player and operated when the pickup arm is raised either to start playing or stop playing. These contacts are opened when the arm lowers to a record or to its rest position when records are changed.

As previously stated, each record has its initial groove cut in such a manner so as to cause the needle to produce a distinctive tone, the tone being different for each different speed record. Thus all records requiring the record to be rotated at 16 r.p.m. will produce a tone of one frequency, those requiring a speed of 33 r.p.m. will produce a tone of another frequency, the 45 r.p.m. records a tone of still another frequency and the 78 r.p.m. records a tone of a fourth distinctive frequency.

The initial groove is cut only for a certain predetermined distance to produce the tone, then has a blank space before the groove is cut to produce the regular music to be played by the record.

At A, I have shown a representation of a so-called vibrating reed tuned relay having four sets of contacts. Only one of these sets of contacts will operate when a particular tone is connected to relay A through the make contacts 1 and 2 of relay T.

Figure 2:
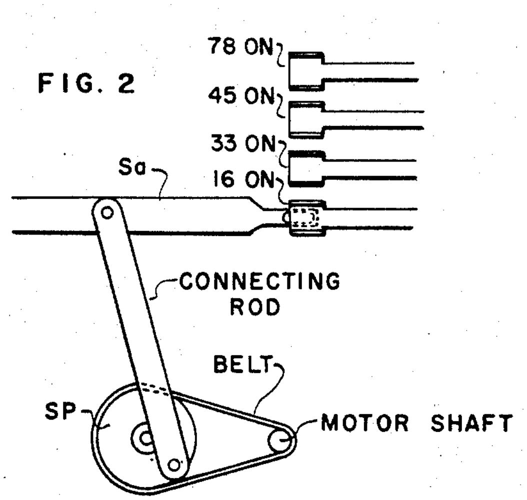
FIG. 2 is a schematic view of the motor and controlling arm for operating the normal springs when the selector arm is in the various positions corresponding to the different record speeds.
Figure 3:
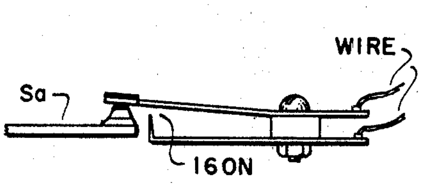
FIG. 3 is a side view of a pair of the normal springs.

At SC, I have indicated a speed changing motor which is arranged in the manner shown in FIGS. 2 and 3 to operate an arm SA which controls the regular speed changing mechanism of the player and also successively opens a set of four off normal springs, one for each speed of the player.

In FIG. 2, I have shown diagrammatically the shaft of the speed change motor SC of FIG. 1 operating a belt by means of a pulley on the end of the shaft to rotate a large pulley SP upon which is eccentrically mounted the connecting rod which moves the arm SA back and forth to successively open the off normal springs 16, 33, 45 and 78 ON and to change the speed of the player. One of the springs 16ON is shown in FIG. 3 in a side view showing how arm SA will lift the end of the upper spring to open the contacts.

When the player is started by operating the usual on and off springs, the contacts M are also closed to prepare a locking circuit for relay H. As the tone arm raises and moves over a record, the mercury contacts MER, on the tone arm, close and complete a circuit for relay H which operates and locks through its own X contacts, contacts M, and the upper closed contacts of relays C, E, G and K. Relay H closes a circuit for relay T at springs 1 and 2 and prepares a circuit at springs 3 and 4 for the speed change motor SC.

Relay T operates to close its springs 1 and 2 to connect the input from the secondary of coil Y to the winding of relay A, and to disconnect said input from the loudspeaker.

As soon as the needle falls into the initial groove of the record, the contacts MER open and the tone produced by the needle passes through the winding of coil A to operate one of the sets of springs 16, 33, 45 or 78 of the tuned relay dependent upon the tone produced by the record.

In the embodiment here shown, I have elected to have the home position of the player be in the 33 r.p.m. position so that if successive records of that speed are played, no change in the speed change position will be required. For this reason I have shown the 33ON contacts as normally open and the 16ON, 45ON and 78ON contacts all normally closed.

Should the record engaged by the needle be one requiring a speed of 33 r.p.m., then contacts 33 of relay A will operate to close the circuit of sensitive relay D which in turn closes the circuit of relay E. Relay E closes its contacts 1 and 2 to close a holding circuit for relay T to hold that relay operated as long as the tone is produced by the record, and opens its springs 3 and 4 in the locking circuit of relay H to cause that relay to quickly release. As soon as the tone ceases, relays D and E will fall back to open the circuit of relay T at springs 1 and 2, which will in turn fall back and connect the input circuit to the loudspeaker so that the regular music of the record will be reproduced therein.

As soon as the record is finished and the tone arm lifts to return to its side post, the contacts MER close to energize and lock relay H which in turn energizes relay T but causes no movement of the speed change motor SC as contacts 33ON are open at this time.

In case the record is one requiring another speed, such as a 16 r.p.m., then the contacts 16 of relay A will be operated when the needle strikes the initial groove and produces the tone of the proper frequency to operate contacts 16. Contacts 16 close the circuit of sensitive relay B which in turn completes the circuit of relay C which locks through its X contacts and off normal spring 16ON.

Relay C closes its contacts 1 and 2 to complete a circuit for the speed change motor SC, closes contacts 3 and 4 to hold relay T operated and opens contacts 5 and 6 in the holding circuit of relay H. The speed change motor, part of which is shown in FIG. 2 moves the regular speed change mechanism of the player and also moves the arm SA back and forth to successively open the sets of normal springs 16ON, 33ON, 45ON and 78ON. When the selector arm has moved the motor to the 16 r.p.m. position it opens the springs 16ON in the holding circuit of relay C to cause that relay to quickly deenergize. Springs 1 and 2 of relay C open the circuit of the speed change motor SC to stop the same in that position, opens the circuit of relay T switch the input to the loudspeaker and opens the holding circuit of relay H.

In this case, after the record has been played and the tone arm lifts to restore to its off side position, the springs MER close momentarily to again cause relay H to energize and lock up. Relay T is again closed by springs 1 and 2 and the circuit of the speed change motor SC is closed through normal springs 33ON, springs 3 and 4 and to the motor. In this case the speed change motor will operate its arm to home position, 33 r.p.m., and when that position is reached, springs 33ON will be opened to stop the motor SC. Relays H and T will remain energized between records unless the on and off switch of the player is operated to open contacts M in the locking circuit of relay H.

The operations for playing a record of the 45 or 78 r.p.m. speeds is quite similar to that explained for the 16 r.p.m. records. The 45 r.p.m. record produces a tone in its initial groove to operate relays F and G so that G operates and locks through the 45ON springs, closes the speed change motor circuit at its springs 1 and 2, holds relay T operated through springs 3 and 4 and opens relay H at springs 5 and 6. The speed change arm opens contacts 45ON at the proper position and relay G restores.

The 78 r.p.m. record produces the proper tone to operate the springs 78 of relay A to in turn operate relays J and K and lock K energized through 78ON springs.

In each case, after a record of the 16, 45 or 78 r.p.m. speeds are played, the player is returned to the 33 r.p.m. or home position. It will be understood that the selection of the 33 r.p.m. position as home position is an arbitrary selection and that the arrangement may be designed to return to any desired position as a home position.

Having fully described the features and aspects of my invention, what I consider to be novel and desire to have protected by Letters Patent will be pointed out in the appended claims.

What I claim is:

1. In a record player, a motor for moving the speed changing mechanism to select the different speeds at which records may be played, an arm on said motor moved back and forth as the speed mechanism operates, a series of pairs of normal contacts operated in the different positions of said arm, means on each record for producing a tone of a distinctive frequency depending upon the speed at which that record is to be played, a circuit for said motor, frequency responsive means for closing the circuit of said motor through a particular pair of said normal contacts dependent upon the frequency of the tone received from a particular record, said particular pair of normal contacts opened to stop the motor in the proper position to cause the player to rotate the record at the proper speed.

2. An automatic speed changer for a record player comprising a motor for moving the speed changing mechanism of the player back and forth through the different positions at which various speeds of the player are controlled, the initial groove of each record cut to produce a tone of a particular frequency dependent upon the speed at which that record is to be played, the tone produced by a record to be played at one speed being different from the tones produced by records to be played at other speeds, a series of frequency responsive devices, each selectively responsive only to the tone producer by a record to be played at a particular speed, means controlled by each of said devices for operating said motor, and means for stopping the motor in a particular position dependent upon the particular one of said frequency responsive devices which was operated, to thereby determine at which speed the record player will be operated.

3. In a record player, means for automatically changing the speed of the player, the initial groove of each record being cut to produce a tone of a particular frequency as the needle traverses said groove, a speaker, a frequency responsive device, means operated by the initial movement of the tone arm, when the player is turned on, for connecting said frequency responsive device to the output from the needle and disconnecting said speaker therefrom, said responsive device operated to control the speed changing means to select a particular speed of rotation of the player dependent upon the tone frequency received from the needle output, and means for thereafter switching the needle output from the frequency responsive device to the speaker.

4. In a record player, means for automatically changing the speed of the player comprising means on each record for producing a tone of a particular frequency dependent upon the speed at which that record is to be played, a frequency responsive device comprising a vibrating reed relay having a series of reeds each tuned to operate only when a particular one of said tones is connected to said relay, means operated responsive to the initiation of the operation of said player for switching the needle output of the player from the usual loudspeaker to said relay for a predetermined time, said relay operated to close a circuit through one of said reeds in response to the receipt of a tone from said output, a motor for operating the speed changing mechanism of the player, a series of contacts opened by said motor in different positions of the mechanism, a locking relay for each of a plurality of said reeds, operated when the corresponding reed is operated to complete a circuit for said motor to successively open said contacts, and means for unlocking said locking relay when the proper speed position is reached, corresponding to the reed operated and therefore to the record producing the particular tone.

5. In a record player, a motor for moving the speed changing mechanism of the player back and forth through the positions representing the different speeds at which the player may be operated, an arm operated by said motor, a series of contacts each opened by said arm in one of said positions, a series of relays, means controlled by the initial rotation of any record for operating one of the relays depending upon the speed at which that record is to be played, each relay having means for operating said motor and arm and each relay controlled by the operation of one of said series of contacts to stop the operation of the motor in the proper position.

References Cited

UNITED STATES PATENTS

| | | | |
|---|---|---|---|
| 1,965,913 | 7/1934 | Taylor | 179—100.4 |
| 2,334,510 | 11/1943 | Roberts | 179—100.4 |
| 2,558,669 | 6/1951 | Breen | 179—100.4 X |
| 2,885,208 | 5/1959 | Pranter | 274—9 X |

BERNARD KONICK, *Primary Examiner.*

R. F. CARDILLO, *Assistant Examiner.*